United States Patent
Jiang et al.

(10) Patent No.: US 11,084,012 B2
(45) Date of Patent: Aug. 10, 2021

(54) AMMONIA DECOMPOSITION APPARATUS AND SYSTEM AND HYDROGEN PRODUCTION METHOD

(71) Applicant: National Engineering Research Center of Chemical Fertilizer Catalyst, Fuzhou University, Fujian (CN)

(72) Inventors: Lilong Jiang, Fujian (CN); Yu Luo, Fujian (CN); Chongqi Chen, Fujian (CN); Xingyi Lin, Fujian (CN); Jianxin Lin, Fujian (CN)

(73) Assignee: National Engineering Research Center of Chemical Fertilizer Catalyst, Fuzhou University, Fujian (CN)

( * ) Notice: Subject to any disclaimer, the term of this patent is extended or adjusted under 35 U.S.C. 154(b) by 24 days.

(21) Appl. No.: 16/809,724

(22) Filed: Mar. 5, 2020

(65) Prior Publication Data
US 2020/0398240 A1    Dec. 24, 2020

(30) Foreign Application Priority Data
Jun. 20, 2019    (CN) .......................... 201910538522.X

(51) Int. Cl.
*B01J 8/02* (2006.01)
*B01J 8/00* (2006.01)
(Continued)

(52) U.S. Cl.
CPC ............. *B01J 8/0285* (2013.01); *B01J 8/009* (2013.01); *B01J 23/462* (2013.01); *B01J 23/755* (2013.01);
(Continued)

(58) Field of Classification Search
CPC ........ B01J 8/0285; B01J 8/009; B01J 23/462; B01J 23/755; B01J 2219/0009;
(Continued)

(56) References Cited

U.S. PATENT DOCUMENTS 2,013,652 A * 9/1935 Hall ...................... C01B 3/047
                                                                 252/374
5,679,313 A * 10/1997 Nojima .................. B01J 29/084
                                                                 423/237
(Continued)

FOREIGN PATENT DOCUMENTS

JP     2009007245 A    1/2009
JP     2010269965 A    12/2010
(Continued)

OTHER PUBLICATIONS

Office Action of corresponding Japanese Application JP 2020-038073; dated Apr. 13, 2021; 8 pages with Translation.

*Primary Examiner* — Huy Tram Nguyen

(57) ABSTRACT

An ammonia decomposition apparatus comprises a casing, a heating zone, a heat exchange zone, a reaction section and a heat exchange coil. The heat exchange coil is spirally wound on an outer wall of the reaction section to efficiently heat ammonia gas. The reaction section has a first reaction zone and a second reaction zone communicated successively, the ammonia gas decomposed into a nitrogen-hydrogen mixture after entering the first reaction zone, with the second reaction zone decomposing for the second time the residual ammonia gas in the nitrogen-hydrogen mixture produced in the first reaction zone, so that the ammonia gas is decomposed more thoroughly. The conversion rate of ammonia gas can reach 99.9% or more, and the residual amount of ammonia gas in the nitrogen-hydrogen mixture can be less than 1000 ppm.

15 Claims, 6 Drawing Sheets

(51) Int. Cl.
    *B01J 23/46*     (2006.01)
    *B01J 23/755*     (2006.01)
    *C01B 3/04*     (2006.01)

(52) U.S. Cl.
    CPC ....... *C01B 3/047* (2013.01); *B01J 2219/0009* (2013.01); *B01J 2219/00128* (2013.01); *B01J 2219/00157* (2013.01); *B01J 2219/00907* (2013.01); *B01J 2219/00918* (2013.01); *C01B 2203/042* (2013.01); *C01B 2203/0405* (2013.01); *C01B 2203/0833* (2013.01); *C01B 2203/1058* (2013.01); *C01B 2210/001* (2013.01); *C01B 2210/0014* (2013.01); *C01B 2210/0046* (2013.01)

(58) Field of Classification Search
    CPC .... B01J 2219/00128; B01J 2219/00157; B01J 2219/00907; B01J 2219/00918; B01J 2208/00504; B01J 8/0492; B01J 8/0453; B01J 8/0496; B01J 8/025; B01J 12/005; B01D 53/229; B01D 53/047; B01D 2256/16; B01D 2257/102; C01B 2203/0883; C01B 2203/0465; C01B 2203/066; C01B 2203/0811; C01B 2203/043; C01B 3/503; C01B 3/56; C01B 2203/0277; C01B 2203/1064; C01B 2210/0065; C01B 3/047; C01B 2203/042; C01B 2203/0833; C01B 2203/1058; C01B 2210/001; C01B 2203/0405; C01B 2210/0014; C01B 2210/0046; Y02E 60/36
    USPC ......................................................... 422/198
    See application file for complete search history.

(56) References Cited

U.S. PATENT DOCUMENTS

| | | |
|---|---|---|
| 2010/0068132 A1 | 3/2010 | Vencill et al. |
| 2018/0015443 A1* | 1/2018 | Finkelshtain ............ B01J 23/78 |

FOREIGN PATENT DOCUMENTS

| | | |
|---|---|---|
| JP | 2010282755 A | 12/2010 |
| JP | 2012167070 A | 9/2012 |
| JP | 2018095512 A | 6/2018 |

* cited by examiner

AMMONIA DECOMPOSITION APPARATUS AND SYSTEM AND HYDROGEN PRODUCTION METHOD

CROSS-REFERENCE TO RELATED APPLICATION(S)

This application claims priority to Chinese Patent Application Serial No. 201910538522.X, filed Jun. 20, 2019, the entire disclosure of which is hereby incorporated by reference.

TECHNICAL FIELD

The present invention relates to the field of hydrogen production technology, and in particular to an ammonia decomposition apparatus and system and a hydrogen production method.

BACKGROUND

A fuel cell, as a chemical device that directly converts chemical energy of a fuel into electric energy, is also called an electrochemical generator. It is the fourth type of power generation technology after hydroelectric power, thermal power and atomic power generation. Since the fuel cell converts the Gibbs' free energy portion of the chemical energy of the fuel into an electric energy by an electrochemical reaction, it is not limited by the Carnot cycle effect, and thus the efficiency is high. In addition, the fuel cell and oxygen are used as raw materials, and no mechanical transmission component is available, so noise pollution is avoided, and less harmful gases are emitted. Therefore, it can be seen that, from the perspectives of energy conservation and ecological environmental protection, fuel cells have a good prospect for development.

Hydrogen is a first-choice fuel for fuel cells. However, hydrogen storage technology still has many challenges. The volumetric energy density of hydrogen at normal temperature and pressure is 0.0108 $MJ \cdot L^{-1}$. To meet the mileage demand of fuel cells for vehicles, hydrogen needs to be pressurized to 35 MPa, so that the volumetric energy density of hydrogen can be increased to 3 $MJ \cdot L^{-1}$. This increases the corresponding investment cost and reduces the safety of fuel cells for vehicles. It is easier, safer, more efficient and economical to use hydrogen-rich fuels such as ammonia, methanol, gasoline and natural gas to provide hydrogen. Ammonia is a hydrogen-rich fuel, and has a hydrogen content of up to 17.6 wt %. It has the advantages of easy liquefaction, a high energy density, no carbon emission, high safety, a low fuel cost, etc. At a pressure of only 2 MPa, ammonia can be liquefied into liquid with a volumetric energy density of up to 13 $MJ \cdot L^{-1}$, which is 3-4 times that of compressed hydrogen storage. Thus, hydrogen production from ammonia catalytic decomposition is an efficient and reliable new way to supply hydrogen to fuel cells. The existing method of hydrogen production from ammonia decomposition has the problems of complicated system structure, low utilization efficiency of a catalyst, serious waste of energy, incomplete ammonia decomposition, and high ammonia residue in the gas after ammonia decomposition.

SUMMARY

Therefore, a technical problem to be solved by the present invention is to overcome the shortcomings of incomplete ammonia decomposition, high ammonia residue in the gas product and the like in hydrogen production from ammonia decomposition in the prior art, thereby providing an ammonia decomposition apparatus and system and an ammonia decomposition method.

To this end, the present invention provides the following technical solutions.

The present invention provides an ammonia decomposition apparatus, including a casing, which includes a heating zone and a heat exchange zone communicated successively; wherein the heating zone and the heat exchange zone can be communicated successively along a length direction of the casing, or communicated in parallel through a pore channel; a reaction section, including a first reaction zone and a second reaction zone communicated successively, wherein the first reaction zone is disposed in the heating zone and filled with a nickel-based catalyst to form a nickel-based catalyst layer, and the second reaction zone is disposed in the heat exchange zone and filled with a ruthenium-based catalyst to form a ruthenium-based catalyst layer; and a heat exchange coil, spirally wound on outer walls of the second reaction zone and the first reaction zone successively, provided with an ammonia gas inlet which is disposed near a hydrogen-nitrogen mixed gas outlet of the second reaction zone and an ammonia gas outlet which is in communication with an ammonia gas inlet of the first reaction zone, and capable of feeding a preheated ammonia gas into the first reaction zone and the second reaction zone successively for carrying out reaction therein.

A thickness ratio of the nickel-based catalyst layer to the ruthenium-based catalyst layer is (1-3):1.

The reaction section has a height-to-diameter ratio of (5-10):1.

The ammonia decomposition apparatus further includes: a burner, disposed in the heating zone and located between an inner wall of the casing and the first reaction zone, and used for maintaining a reaction temperature in the first reaction zone; and a dividing plate, disposed in the casing to divide the casing to form the heating zone and the heat exchange zone, and provided with a plurality of exhaust gas through holes through which an exhaust gas in the burner enters the heat exchange zone to serve as a heat exchange medium therein.

The ammonia decomposition apparatus comprises at least two of said reaction sections which are disposed parallel to each other in the casing; and a ratio of an inner diameter of each of the reaction sections to a particle diameter of the nickel-based catalyst or the ruthenium-based catalyst is (8-50):1.

The reaction section is a fixed bed reactor; and the burner is a porous medium burner or a catalytic burner, wherein the porous medium burner is a burner with a porous medium structure.

The present invention further provides an ammonia decomposition system, including the aforementioned ammonia decomposition apparatus; a first heat exchange device, respectively connected to the ammonia gas inlet of the heat exchange coil and the hydrogen-nitrogen mixed gas outlet of the second reaction zone, and capable of carrying out indirect heat exchange between the ammonia gas and the hydrogen-nitrogen mixed gas and feeding the ammonia gas to the first reaction zone after the indirect heat exchange; and a second heat exchange device, respectively connected to the heat exchange zone and the heating zone, and capable of carrying out indirect heat exchange between an exhaust gas from the heat exchange zone and a fuel gas and feeding the fuel gas after the indirect heat exchange to the heating zone for combustion.

The ammonia decomposition system further includes: a gas separation device, connected to the first heat exchange device and capable of receiving the hydrogen-nitrogen mixed gas after heat exchange and carrying out separation to obtain high-purity hydrogen, and including a pressure swing adsorption device and a membrane separation device in bidirectional communication, wherein the pressure swing adsorption device is connected to the first heat exchange device and capable of receiving the hydrogen-nitrogen mixed gas after heat exchange and carrying out separation to obtain the high-purity hydrogen; and the membrane separation device is in bidirectional communication with the pressure swing adsorption device and capable of receiving an unseparated nitrogen-hydrogen mixture from the pressure swing adsorption device and passing the same therethrough and then recycling the same to the pressure swing adsorption device to undergo separation to obtain high-purity hydrogen; or an ammonia removal device, connected to the first heat exchange device and capable of receiving the hydrogen-nitrogen mixed gas after heat exchange and removing residual ammonia in the hydrogen-nitrogen mixed gas, and further communicated with a hydrogen fuel cell and capable of feeding the hydrogen-nitrogen mixed gas after the removal of residual ammonia into the hydrogen fuel cell; and an exhaust gas outlet of the hydrogen fuel cell being connected to the second heat exchange device, so that a hydrogen-containing exhaust gas discharged from the hydrogen fuel cell is mixed with the fuel gas and subjected to heat exchange and then fed into the heating zone for combustion; and an ammonia storage tank connected to the first heat exchange device; and a fuel tank connected to the second heat exchange device.

The first heat exchange device is a heat exchanger or an evaporator; and the second heat exchange device is a heat exchanger or an evaporator.

In addition, the present invention further provides an ammonia decomposition method using the aforementioned ammonia decomposition apparatus, including the following step: introducing ammonia gas into the first reaction zone and the second reaction zone successively at a space velocity of 500-10000 mL/($g_{cat}$·h) to undergo decomposition to produce a nitrogen-hydrogen mixture, wherein the first reaction zone has a reaction temperature of 650-850° C.; and the second reaction zone has a reaction temperature of 450-600° C.

The technical solutions of the present invention have the following advantages:

1. The ammonia decomposition apparatus provided in the present invention includes a casing, a heating zone, a heat exchange zone, a reaction section and a heat exchange coil, wherein the heat exchange coil is spirally wound on an outer wall of the reaction section, so that ammonia gas can be heated sufficiently, and the heating efficiency of the ammonia gas is increased; the reaction section is provided with a first reaction zone and a second reaction zone communicated successively, to ensure that the ammonia gas is decomposed into a nitrogen-hydrogen mixture after entering the first reaction zone, so that the decomposition efficiency of the ammonia gas is improved, and the second reaction zone can decompose for the second time the residual ammonia gas in the nitrogen-hydrogen mixture produced in the first reaction zone, to reduce the residual amount of ammonia gas in the nitrogen-hydrogen mixture in the second reaction zone, so that the ammonia gas is decomposed more thoroughly; with the apparatus, the conversion rate of ammonia gas can reach 99.9% or more, and the residual amount of ammonia gas in the nitrogen-hydrogen mixture can be less than 1000 ppm.

2. In the ammonia decomposition apparatus provided in the present invention, a thickness ratio of the nickel-based catalyst layer and the ruthenium-based catalyst layer is controlled to (1-3):1, so that the temperature distribution of the reactor can be controlled, the catalyst cost can be saved, and the compactness effect of the apparatus can be improved.

3. The ammonia decomposition system provided in the present invention includes an ammonia decomposition apparatus, a first heat exchange device and a section heat exchange device; in the system, the first heat exchange device is connected to an ammonia gas inlet of the first reaction zone and a hydrogen-nitrogen mixed gas outlet of the second reaction zone, and capable of carrying out indirect heat exchange between the ammonia gas and the hydrogen-nitrogen mixed gas and feeding the ammonia gas to the first reaction zone after the indirect heat exchange; the second heat exchange device is respectively connected to the heat exchange zone and the heating zone, and capable of carrying out indirect heat exchange between an exhaust gas from the heat exchange zone and a fuel gas and feeding the fuel gas after the indirect heat exchange to the heating zone for combustion; in this way, waste heat can be fully used, and the utilization efficiency of the system can be improved.

4. In the case the ammonia decomposition system provided in the present invention includes a gas separation device including a pressure swing adsorption device and a membrane separation device, when the nitrogen-hydrogen mixture is separated to obtain high-purity hydrogen, the purity of hydrogen can be increased, so that the amount of hydrogen can be 99.9% or more by volume; in the case the system includes an ammonia removal device and a hydrogen fuel cell, the system can provide a stable raw material for the hydrogen fuel cell, and also can cyclically use a hydrogen-containing exhaust gas generated by the hydrogen fuel cell, so that the utilization rate of the system is improved.

5. In the ammonia decomposition method provided in the present invention, a reaction temperature in the first fixed bed reactor is set to 650-850° C.; and a reaction temperature in the second fixed bed reactor is set to 450-600° C., so that the catalytic effect of the catalysts can be fully achieved, the decomposition efficiency of ammonia gas under the nickel-based catalyst and the ruthenium-based catalyst can be improved, and the residual amount of ammonia gas in the product can be reduced.

BRIEF DESCRIPTION OF THE DRAWINGS

To more clearly describe technical solutions in the embodiments of the present invention or in the prior art, a brief introduction to the drawings for use in description of the embodiments or the prior art will be given below. Apparently, the drawings described below illustrate some embodiments of the present invention, and to those of ordinary skill in the art, other drawings may also be obtained based on these drawings without any creative effort.

Figure 1:
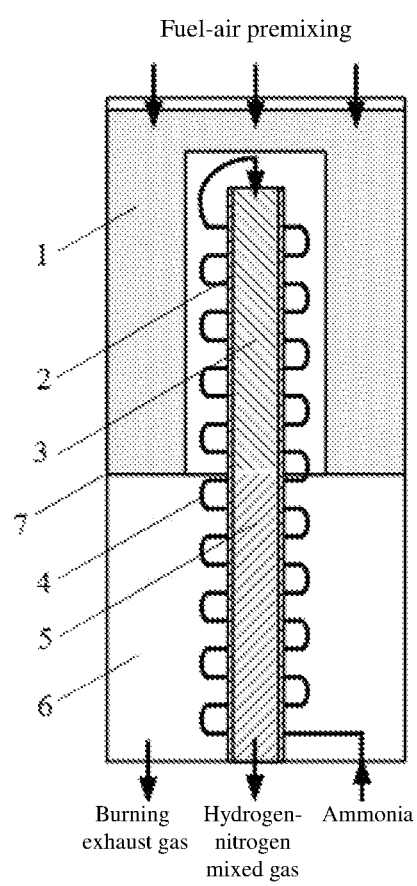
FIG. 1 is a structural schematic diagram of an ammonia decomposition apparatus in embodiment 1 of the present invention.

Reference numerals: 1—burner; 2—reaction section; 3—first reaction zone; 4—heat exchange coil; 5—second reaction zone; 6—heat exchange zone; 7—dividing plate; 8—first heat exchange device; 9—second heat exchange device; 10—ammonia storage tank; 11—fuel tank; 12—ammonia removal device; 13—pressure swing adsorption device; 14—membrane separation device; 15—hydrogen fuel cell.

DETAILED DESCRIPTION

The following embodiments are provided to further understand the present invention, are not limited to the preferred embodiments, and do not limit the contents and the protection scope of the present invention. All products that are identical or similar to the present invention obtained by any person under enlightenment of the present invention or by combing features of the present invention and other prior art fall within the protection scope of the present invention.

If specific experimental steps or conditions are not indicated in embodiments, such embodiments can be implemented according to operations or conditions of the conventional experimental steps described in the literature in the art. Reagents or instruments adopted, whose manufacturers are not indicated, are conventional reagent products which are commercially available.

Embodiment 1

The present embodiment provides an ammonia decomposition apparatus, the structure of which is shown in FIG. 1, including a casing, which includes a heating zone and a heat exchange zone 6 communicated successively along a length direction of the casing;

a reaction section 2, including a first reaction zone 3 and a second reaction zone 5 communicated successively, wherein the first reaction zone is disposed in the heating zone and filled with a nickel-based catalyst to form a nickel-based catalyst layer, and the second reaction zone is disposed in the heat exchange zone and filled with a ruthenium-based catalyst to form a ruthenium-based catalyst layer; specifically, in the present embodiment, the reaction section 2 is a fixed bed reactor with a height-to-diameter ratio of 8:1; the first reaction zone and the second reaction zone are disposed in the same fixed bed reactor, wherein the first reaction zone 3 is disposed at an end close to the heating zone within the fixed bed reactor, and the second reaction zone 5 is disposed at an end close to the heat exchange zone within the fixed bed reactor; a thickness ratio of the nickel-based catalyst layer to the ruthenium-based catalyst layer is 3:1; and a ratio of an inner diameter of the fixed bed reactor to a particle diameter of the nickel-based catalyst or the ruthenium-based catalyst is 20:1;

a heat exchange coil 4, spirally wound on outer walls of the second reaction zone and the first reaction zone successively, provided with an ammonia gas inlet which is disposed near a hydrogen-nitrogen mixed gas outlet of the second reaction zone and an ammonia gas outlet which is in communication with an ammonia gas inlet of the first reaction zone, and capable of feeding a preheated ammonia gas into the first reaction zone and the second reaction zone successively for carrying out reaction therein; wherein specifically, in the present embodiment, the heat exchange coil is spirally wound on an outer wall of the fixed bed reactor;

a burner 1, disposed in the heating zone and located between an inner wall of the casing and the first reaction zone, and used for maintaining a reaction temperature in the first reaction zone; wherein specifically, in the present embodiment, the burner is a porous medium burner; and a dividing plate 7, disposed in the casing to divide the casing to form the heating zone and the heat exchange zone, and provided with a plurality of exhaust gas through holes through which an exhaust gas in the burner enters the heat exchange zone to serve as a heat exchange medium therein.

Figure 2:
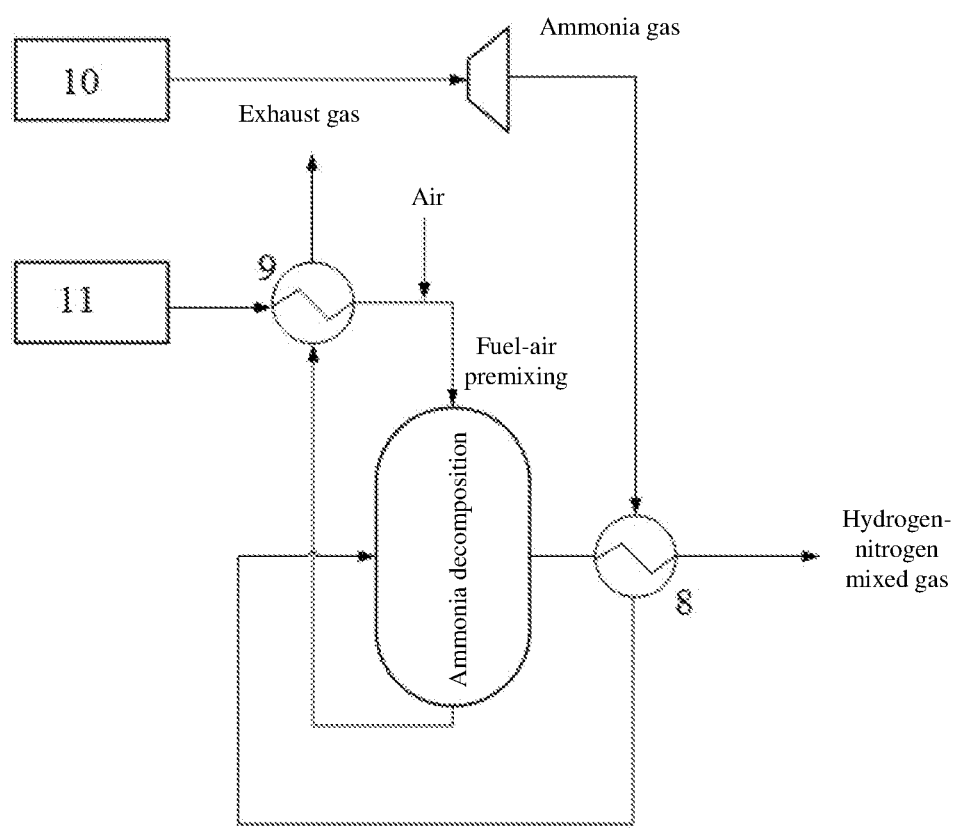
FIG. 2 is a structural schematic diagram of an ammonia decomposition system in embodiments 1 and 2 of the present invention.

The present embodiment further provides an ammonia decomposition system including the aforementioned apparatus, as shown in FIG. 2, and the ammonia decomposition system includes:

a first heat exchange device 8, respectively connected to the ammonia gas inlet of the heat exchange coil and the hydrogen-nitrogen mixed gas outlet of the second reaction zone, and capable of carrying out indirect heat exchange between the ammonia gas and the hydrogen-nitrogen mixed gas and feeding the ammonia gas to the first reaction zone after the indirect heat exchange; wherein specifically, in the present embodiment, the first heat exchange device is a first heat exchanger;

a second heat exchange device 9, respectively connected to the heat exchange zone and the heating zone, and capable of carrying out indirect heat exchange between an exhaust gas from the heat exchange zone and a fuel gas and feeding the fuel gas after the indirect heat exchange to the heating zone for combustion; wherein specifically, in the present embodiment, the second heat exchange device is a second heat exchanger;

an ammonia storage tank 10 connected to the first heat exchange device; and a fuel tank 11 connected to the second heat exchange device.

In addition, the present embodiment further provides an ammonia decomposition method, including the following step: introducing ammonia gas into a first reaction zone and a second reaction zone successively at a space velocity of 2000 mL/($g_{cat}$·h) to undergo decomposition to produce a nitrogen-hydrogen mixture, wherein the first reaction zone has a reaction temperature of 700° C.; and the second reaction zone has a reaction temperature of 500° C.; and wherein in the nitrogen-hydrogen mixture, hydrogen gas exists in an amount of 75% by volume, nitrogen gas exists in an amount of 25% by volume, and ammonia gas exists in an amount of less than 1000 ppm.

Embodiment 2

Figure 3:
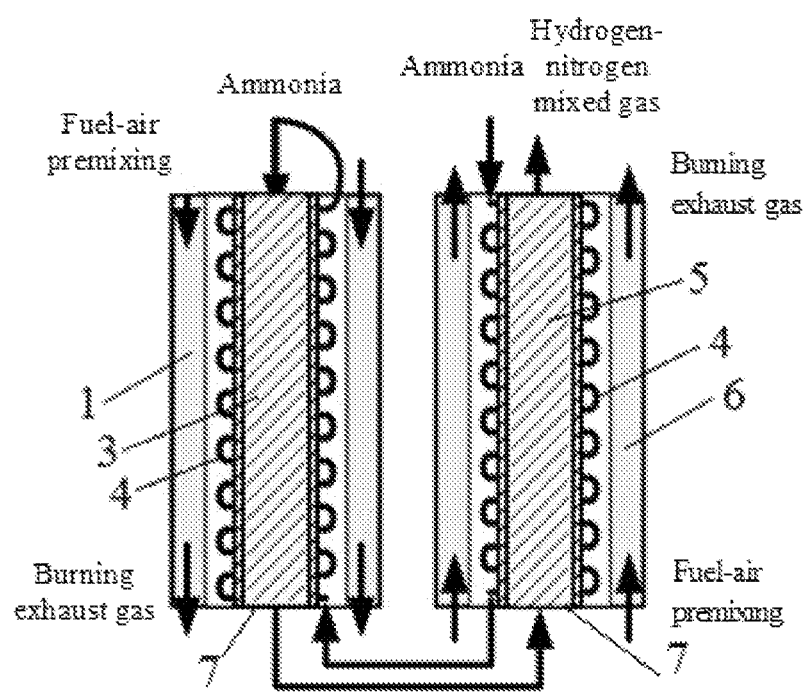
FIG. 3 is a structural schematic diagram of an ammonia decomposition apparatus in embodiment 2 of the present invention.

The present embodiment provides an ammonia decomposition apparatus, the structure of which is shown in FIG. 3, including a casing, and further including a heating zone and a heat exchange zone 6 communicated successively, wherein the heating zone and the heat exchange zone are communicated in parallel through a pore channel;

a reaction section, including a first reaction zone 3 and a second reaction zone 5 communicated successively, wherein the first reaction zone is disposed in the heating zone and filled with a nickel-based catalyst to form a nickel-based catalyst layer, and the second reaction zone is disposed in the heat exchange zone and filled with a ruthenium-based catalyst to form a ruthenium-based catalyst layer; specifically, in the present embodiment, the reaction section is a fixed bed reactor with a height-to-diameter ratio of 5:1; the first reaction zone and the second reaction zone are disposed in two fixed bed reactors respectively, and the two fixed bed reactors are communicated in series through a pipeline, wherein the first reaction zone 3 is disposed within the first fixed bed reactor, and the second reaction zone 5 is disposed within the second fixed bed reactor; a thickness ratio of the nickel-based catalyst layer to the ruthenium-based catalyst layer is 1:1; and a ratio of an inner diameter of the fixed bed reactor to a particle diameter of the nickel-based catalyst or the ruthenium-based catalyst is 40:1;

a heat exchange coil 4, spirally wound on outer walls of the second reaction zone and the first reaction zone successively, provided with an ammonia gas inlet which is disposed near a hydrogen-nitrogen mixed gas outlet of the second reaction zone and an ammonia gas outlet which is in communication with an ammonia gas inlet of the first reaction zone, and capable of feeding a preheated ammonia gas into the first reaction zone and the second reaction zone successively for carrying out reaction therein; wherein specifically, in the present embodiment, the heat exchange coil is spirally wound on outer walls of the first fixed bed reactor and the second fixed bed reactor successively;

a burner 1, disposed in the heating zone and located between an inner wall of the casing and the first reaction zone, and used for maintaining a reaction temperature in the first reaction zone; wherein specifically, in the present embodiment, the burner is a porous medium burner; and a dividing plate 7, disposed in the casing to divide the casing to form the heating zone and the heat exchange zone, and provided with a plurality of exhaust gas through holes through which an exhaust gas in the burner enters the heat exchange zone to serve as a heat exchange medium therein.

The present embodiment further provides an ammonia decomposition system including the aforementioned apparatus, as shown in FIG. 2; and the ammonia decomposition system includes:

a first heat exchange device 8, respectively connected to the ammonia gas inlet of the heat exchange coil and the hydrogen-nitrogen mixed gas outlet of the second reaction zone, and capable of carrying out indirect heat exchange between the ammonia gas and the hydrogen-nitrogen mixed gas and feeding the ammonia gas to the first reaction zone after the indirect heat exchange; wherein specifically, in the present embodiment, the first heat exchange device is a first heat exchanger;

a second heat exchange device 9, respectively connected to the heat exchange zone and the heating zone, and capable of carrying out indirect heat exchange between an exhaust gas from the heat exchange zone and a fuel gas and feeding the fuel gas after the indirect heat exchange to the heating zone for combustion; wherein specifically, in the present embodiment, the second heat exchange device is a second heat exchanger;

an ammonia storage tank 10 connected to the first heat exchange device; and a fuel tank 11 connected to the second heat exchange device.

In addition, the present embodiment further provides an ammonia decomposition method, including the following step: introducing ammonia gas into a first reaction zone and a second reaction zone successively at a space velocity of 2000 mL/($g_{cat}$·h) to undergo decomposition to produce a nitrogen-hydrogen mixture, wherein the first reaction zone has a reaction temperature of 700° C.; and the second reaction zone has a reaction temperature of 500° C.; and wherein in the nitrogen-hydrogen mixture, hydrogen gas exists in an amount of 75% by volume, nitrogen gas exists in an amount of 25% by volume, and ammonia gas exists in an amount of less than 1000 ppm.

Embodiment 3

The present embodiment provides an ammonia decomposition apparatus, the structure of which is shown in FIG. 1, including a casing, which includes a heating zone and a heat exchange zone 6 communicated successively along a length direction of the casing;

a reaction section 2, including a first reaction zone 3 and a second reaction zone 5 communicated successively, wherein the first reaction zone is disposed in the heating zone and filled with a nickel-based catalyst to form a nickel-based catalyst layer, and the second reaction zone is disposed in the heat exchange zone and filled with a ruthenium-based catalyst to form a ruthenium-based catalyst layer; specifically, in the present embodiment, the reaction section 2 is a fixed bed reactor with a height-to-diameter ratio of 8:1; the first reaction zone and the second reaction zone are disposed in the same fixed bed reactor, wherein the first reaction zone 3 is disposed at an end close to the heating zone within the fixed bed reactor, and the second reaction zone 5 is disposed at an end close to the heat exchange zone within the fixed bed reactor; a thickness ratio of the nickel-based catalyst layer to the ruthenium-based catalyst layer is 3:1; and a ratio of an inner diameter of the fixed bed reactor to a particle diameter of the nickel-based catalyst or the ruthenium-based catalyst is 20:1;

a heat exchange coil 4, spirally wound on outer walls of the second reaction zone and the first reaction zone successively, provided with an ammonia gas inlet which is disposed near a hydrogen-nitrogen mixed gas outlet of the second reaction zone and an ammonia gas outlet which is in communication with an ammonia gas inlet of the first reaction zone, and capable of feeding a preheated ammonia gas into the first reaction zone and the second reaction zone successively for carrying out reaction therein; wherein specifically, in the present embodiment, the heat exchange coil is spirally wound on an outer wall of the fixed bed reactor;

a burner 1, disposed in the heating zone and located between an inner wall of the casing and the first reaction zone, and used for maintaining a reaction temperature in the first reaction zone; wherein specifically, in the present embodiment, the burner is a porous medium burner; and a dividing plate 7, disposed in the casing to divide the casing to form the heating zone and the heat exchange zone, and provided with a plurality of exhaust gas through holes through which an exhaust gas in the burner enters the heat exchange zone to serve as a heat exchange medium therein.

Figure 4:
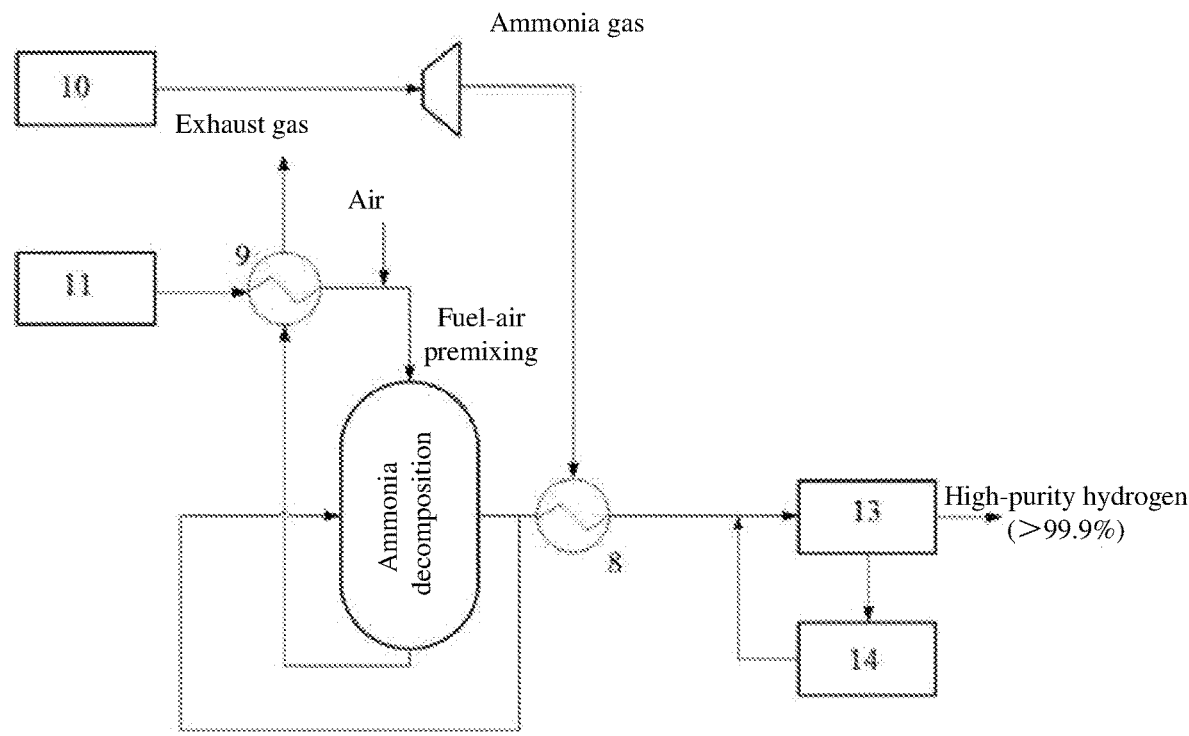
FIG. 4 is a structural schematic diagram of an ammonia decomposition system in embodiment 3 of the present invention.

The present embodiment further provides an ammonia decomposition hydrogen production system including the aforementioned apparatus, as shown in FIG. 4; and the ammonia decomposition hydrogen production system includes:

a first heat exchange device 8, respectively connected to the ammonia gas inlet of the heat exchange coil and the hydrogen-nitrogen mixed gas outlet of the second reaction zone, and capable of carrying out indirect heat exchange between the ammonia gas and the hydrogen-nitrogen mixed gas and feeding the ammonia gas to the first reaction zone after the indirect heat exchange; wherein specifically, in the present embodiment, the first heat exchange device is a first heat exchanger;

a second heat exchange device 9, respectively connected to the heat exchange zone and the heating zone, and capable of carrying out indirect heat exchange between an exhaust gas from the heat exchange zone and a fuel gas and feeding the fuel gas after the indirect heat exchange to the heating zone for combustion; wherein specifically, in the present embodiment, the second heat exchange device is a second heat exchanger;

a gas separation device, connected to the first heat exchange device and capable of receiving the hydrogen-nitrogen mixed gas after heat exchange and carrying out separation to obtain high-purity hydrogen, and including a pressure swing adsorption device 13 and a membrane separation device 14 in bidirectional communication, wherein the pressure swing adsorption device is connected to the first heat exchange device and capable of receiving the hydrogen-nitrogen mixed gas after heat exchange and carrying out separation to obtain the high-purity hydrogen; and the membrane separation device is in bidirectional communication with the pressure swing adsorption device and capable of receiving an unseparated nitrogen-hydrogen mixture from the pressure swing adsorption device and passing the same therethrough and then recycling the same to the pressure swing adsorption device to undergo separation to obtain high-purity hydrogen; specifically, in the present embodiment, a volume ratio of nitrogen to hydrogen in the unseparated nitrogen-hydrogen mixture entering the membrane separation device from the pressure swing adsorption device is 1:1;

an ammonia storage tank 10 connected to the first heat exchange device; and a fuel tank 11 connected to the second heat exchange device.

In addition, the present embodiment further provides an ammonia decomposition method, including the following steps: introducing ammonia gas into a first reaction zone and a second reaction zone successively at a space velocity of 5000 mL/($g_{cat}$·h) to undergo decomposition to produce a nitrogen-hydrogen mixture; and feeding the nitrogen-hydrogen mixture into a gas separation device to obtain high-purity hydrogen, wherein the first reaction zone has a reaction temperature of 850° C.; and the second reaction zone has a reaction temperature of 450° C.; and the obtained high-purity hydrogen exists in an amount of more than 99.9% by volume, and a hydrogen recovery rate is 85%.

Embodiment 4

The present embodiment provides an ammonia decomposition apparatus, the structure of which is shown in FIG. 1, including a casing, which includes a heating zone and a heat exchange zone 6 communicated successively along a length direction of the casing;

a reaction section 2, including a first reaction zone 3 and a second reaction zone 5 communicated successively, wherein the first reaction zone is disposed in the heating zone and filled with a nickel-based catalyst to form a nickel-based catalyst layer, and the second reaction zone is disposed in the heat exchange zone and filled with a ruthenium-based catalyst to form a ruthenium-based catalyst layer; specifically, in the present embodiment, the reaction section 2 is a fixed bed reactor with a height-to-diameter ratio of 8:1; the first reaction zone and the second reaction zone are disposed in the same fixed bed reactor, wherein the first reaction zone 3 is disposed at an end close to the heating zone within the fixed bed reactor, and the second reaction zone 5 is disposed at an end close to the heat exchange zone within the fixed bed reactor; a thickness ratio of the nickel-based catalyst layer to the ruthenium-based catalyst layer is 3:1; and a ratio of an inner diameter of the fixed bed reactor to a particle diameter of the nickel-based catalyst or the ruthenium-based catalyst is 8:1;

a heat exchange coil 4, spirally wound on outer walls of the second reaction zone and the first reaction zone successively, provided with an ammonia gas inlet which is disposed near a hydrogen-nitrogen mixed gas outlet of the second reaction zone and an ammonia gas outlet which is in communication with an ammonia gas inlet of the first reaction zone, and capable of feeding a preheated ammonia gas into the first reaction zone and the second reaction zone successively for carrying out reaction therein; wherein specifically, in the present embodiment, the heat exchange coil is spirally wound on an outer wall of the fixed bed reactor;

a burner 1, disposed in the heating zone and located between an inner wall of the casing and the first reaction zone, and used for maintaining a reaction temperature in the first reaction zone; wherein specifically, in the present embodiment, the burner is a porous medium burner; and a dividing plate 7, disposed in the casing to divide the casing to form the heating zone and the heat exchange zone, and provided with a plurality of exhaust gas through holes through which an exhaust gas in the burner enters the heat exchange zone to serve as a heat exchange medium therein.

Figure 5:
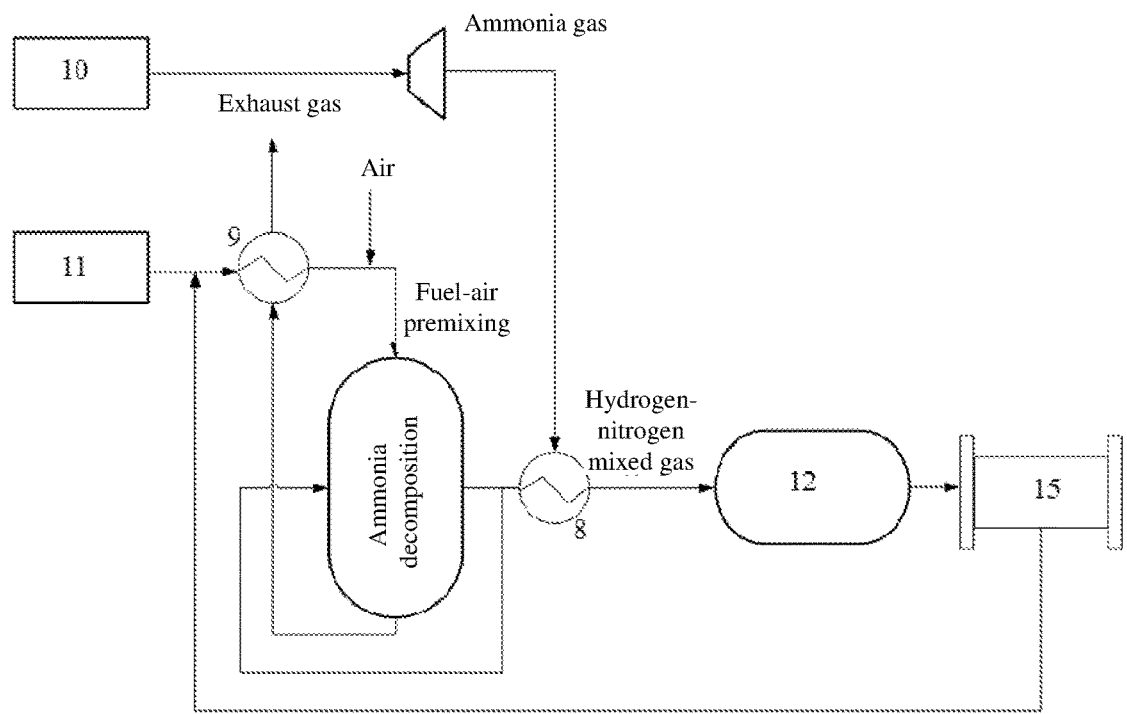
FIG. 5 is a structural schematic diagram of an ammonia decomposition system in embodiment 4 of the present invention.

The present embodiment further provides an ammonia decomposition system including the aforementioned apparatus, as shown in FIG. 5; and the ammonia decomposition system includes:

a first heat exchange device 8, respectively connected to the ammonia gas inlet of the heat exchange coil and the hydrogen-nitrogen mixed gas outlet of the second reaction zone, and capable of carrying out indirect heat exchange between the ammonia gas and the hydrogen-nitrogen mixed gas and feeding the ammonia gas to the first reaction zone after the indirect heat exchange; wherein specifically, in the present embodiment, the first heat exchange device is a first heat exchanger;

a second heat exchange device 9, respectively connected to the heat exchange zone and the heating zone, and capable of carrying out indirect heat exchange between an exhaust gas from the heat exchange zone and a fuel gas and feeding the fuel gas after the indirect heat exchange to the heating zone for combustion; wherein specifically, in the present embodiment, the second heat exchange device is a second heat exchanger;

an ammonia removal device 12, connected to the first heat exchange device and capable of receiving the hydrogen-nitrogen mixed gas after heat exchange and removing residual ammonia in the hydrogen-nitrogen mixed gas, and further communicated with a hydrogen fuel cell 15 and capable of feeding the hydrogen-nitrogen mixed gas after the removal of residual ammonia into the hydrogen fuel cell; and an exhaust gas outlet of the hydrogen fuel cell being connected to the second heat exchange device so that a hydrogen-containing exhaust gas discharged from the hydrogen fuel cell is mixed with the fuel gas and subjected to heat exchange and then fed into the heating zone for combustion; and an ammonia storage tank 10 connected to the first heat exchange device; and a fuel tank 11 connected to the second heat exchange device.

In addition, the present embodiment further provides an ammonia decomposition method, including the following steps: introducing ammonia gas into a first reaction zone and a second reaction zone successively at a space velocity of 1000 mL/($g_{cat}$·h) to undergo decomposition to produce a nitrogen-hydrogen mixture; and feeding the nitrogen-hydrogen mixture into a ammonia removal device, and then into a hydrogen fuel cell to provide a raw material therefor; and mixing a hydrogen-containing exhaust gas discharged from the hydrogen fuel cell with a fuel gas, and subjecting the mixed gas to heat exchange and feeding the mixed gas into a heating zone for combustion; wherein the first reaction zone has a reaction temperature of 650° C.; and the second reaction zone has a reaction temperature of 450° C.

In addition, the present embodiment further provides a method for hydrogen production from ammonia decomposition, and cyclic utilization of hydrogen. The method includes: discharging ammonia gas from an ammonia gas storage device, introducing the ammonia gas into a heat exchanger and then into a coil of an ammonia decomposition apparatus, and feeding the gas after heating into a first fixed bed reactor and a second fixed bed reactor successively to undergo decomposition to generate a nitrogen-hydrogen mixture; feeding the nitrogen-hydrogen mixture into an ammonia removal device, and then into a fuel cell to supply gas therefor, and subjecting a hydrogen exhaust gas discharged from the fuel cell to exchange heat with a fuel supplied from a fuel storage device.

Embodiment 5

The present embodiment provides an ammonia decomposition apparatus, the structure of which is shown in FIG. 1, including a casing, which includes a heating zone and a heat exchange zone 6 communicated successively along a length direction of the casing;

a reaction section 2, including a first reaction zone 3 and a second reaction zone 5 communicated successively, wherein the first reaction zone is disposed in the heating zone and filled with a nickel-based catalyst to form a nickel-based catalyst layer, and the second reaction zone is disposed in the heat exchange zone and filled with a ruthenium-based catalyst to form a ruthenium-based catalyst layer; specifically, in the present embodiment, the reaction section 2 is a fixed bed reactor with a height-to-diameter ratio of 8:1; the first reaction zone and the second reaction zone are disposed in the same fixed bed reactor, wherein the first reaction zone 3 is disposed at an end close to the heating zone within the fixed bed reactor, and the second reaction zone 5 is disposed at an end close to the heat exchange zone within the fixed bed reactor; a thickness ratio of the nickel-based catalyst layer to the ruthenium-based catalyst layer is 3:1; and a ratio of an inner diameter of the fixed bed reactor to a particle diameter of the nickel-based catalyst or the ruthenium-based catalyst is 20:1;

a heat exchange coil 4, spirally wound on outer walls of the second reaction zone and the first reaction zone successively, provided with an ammonia gas inlet which is disposed near a hydrogen-nitrogen mixed gas outlet of the second reaction zone and an ammonia gas outlet which is in communication with an ammonia gas inlet of the first reaction zone, and capable of feeding a preheated ammonia gas into the first reaction zone and the second reaction zone successively for carrying out reaction therein; wherein specifically, in the present embodiment, the heat exchange coil is spirally wound on an outer wall of the fixed bed reactor;

a burner 1, disposed in the heating zone and located between an inner wall of the casing and the first reaction zone, and used for maintaining a reaction temperature in the first reaction zone; wherein specifically, in the present embodiment, the burner is a porous medium burner; and a dividing plate 7, disposed in the casing to divide the casing to form the heating zone and the heat exchange zone, and provided with a plurality of exhaust gas through holes through which an exhaust gas in the burner enters the heat exchange zone to serve as a heat exchange medium therein.

Figure 6:
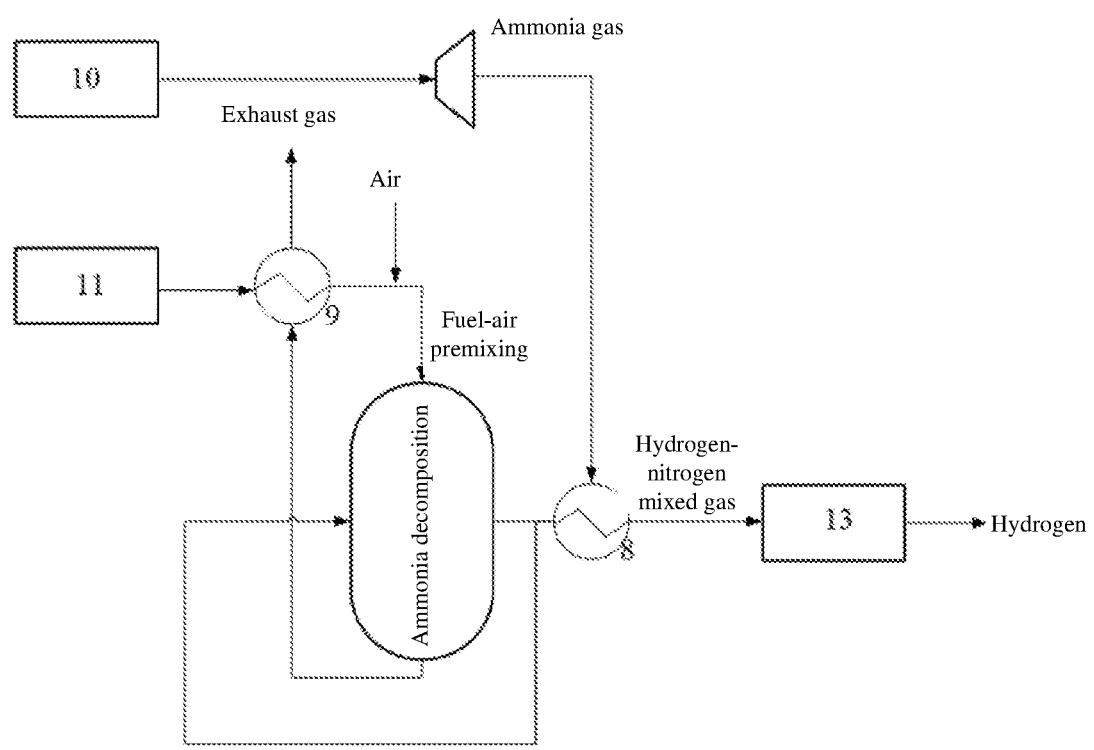
FIG. 6 is a structural schematic diagram of an ammonia decomposition system in embodiment 5 of the present invention.

The present embodiment further provides an ammonia decomposition hydrogen production system including the aforementioned apparatus, as shown in FIG. 6; and the ammonia decomposition hydrogen production system includes:

a first heat exchange device 8, respectively connected to the ammonia gas inlet of the heat exchange coil and the hydrogen-nitrogen mixed gas outlet of the second reaction zone, and capable of carrying out indirect heat exchange between the ammonia gas and the hydrogen-nitrogen mixed gas and feeding the ammonia gas to the first reaction zone after the indirect heat exchange; wherein specifically, in the present embodiment, the first heat exchange device is a first heat exchanger;

a second heat exchange device 9, respectively connected to the heat exchange zone and the heating zone, and capable of carrying out indirect heat exchange between an exhaust gas from the heat exchange zone and a fuel gas and feeding the fuel gas after the indirect heat exchange to the heating zone for combustion; wherein specifically, in the present embodiment, the second heat exchange device is a second heat exchanger;

a pressure swing adsorption device connected to the first heat exchange device and capable of receiving the hydrogen-nitrogen mixed gas after heat exchange and carrying out separation to obtain the high-purity hydrogen;

an ammonia storage tank 10 connected to the first heat exchange device; and a fuel tank 11 connected to the second heat exchange device.

In addition, the present embodiment further provides an ammonia decomposition method, including the following steps: introducing an ammonia gas into a first reaction zone and a second reaction zone successively at a space velocity of 5000 mL/($g_{cat}$·h) to undergo decomposition to produce a nitrogen-hydrogen mixture; and feeding the nitrogen-hydrogen mixture into a pressure swing adsorption device to obtain high-purity hydrogen, wherein the first reaction zone has a reaction temperature of 850° C.; and the second reaction zone has a reaction temperature of 450° C.; and the obtained high-purity hydrogen exists in an amount of more than 99.9% by volume, and a hydrogen recovery rate is 60%.

Embodiment 6

The present embodiment provides an ammonia decomposition apparatus, the structure of which is shown in FIG. 1, including a casing, which includes a heating zone and a heat exchange zone 6 communicated successively along a length direction of the casing;

a reaction section 2, including a first reaction zone 3 and a second reaction zone 5 communicated successively, wherein the first reaction zone is disposed in the heating zone and filled with a nickel-based catalyst to form a nickel-based catalyst layer, and the second reaction zone is disposed in the heat exchange zone and filled with a ruthenium-based catalyst to form a ruthenium-based catalyst layer; specifically, in the present embodiment, the reaction section 2 is a fixed bed reactor with a height-to-diameter ratio of 8:1; the first reaction zone and the second reaction zone are disposed in the same fixed bed reactor, wherein the first reaction zone 3 is disposed at an end close to the heating zone within the fixed bed reactor, and the second reaction zone 5 is disposed at an end close to the heat exchange zone within the fixed bed reactor; a thickness ratio of the nickel-based catalyst layer to the ruthenium-based catalyst layer is 3:1; and a ratio of an inner diameter of the fixed bed reactor to a particle diameter of the nickel-based catalyst or the ruthenium-based catalyst is 20:1;

a heat exchange coil 4, spirally wound on outer walls of the second reaction zone and the first reaction zone successively, provided with an ammonia gas inlet which is disposed near a hydrogen-nitrogen mixed gas outlet of the second reaction zone and an ammonia gas outlet which is in communication with an ammonia gas inlet of the first reaction zone, and capable of feeding a preheated ammonia gas into the first reaction zone and the second reaction zone successively for carrying out reaction therein; wherein specifically, in the present embodiment, the heat exchange coil is spirally wound on an outer wall of the fixed bed reactor;

a burner 1, disposed in the heating zone and located between an inner wall of the casing and the first reaction zone, and used for maintaining a reaction temperature in the first reaction zone; wherein specifically, in the present embodiment, the burner is a porous medium burner; and a dividing plate 7, disposed in the casing to divide the casing to form the heating zone and the heat exchange zone, and provided with a plurality of exhaust gas through holes through which an exhaust gas in the burner enters the heat exchange zone to serve as a heat exchange medium therein.

Figure 7:
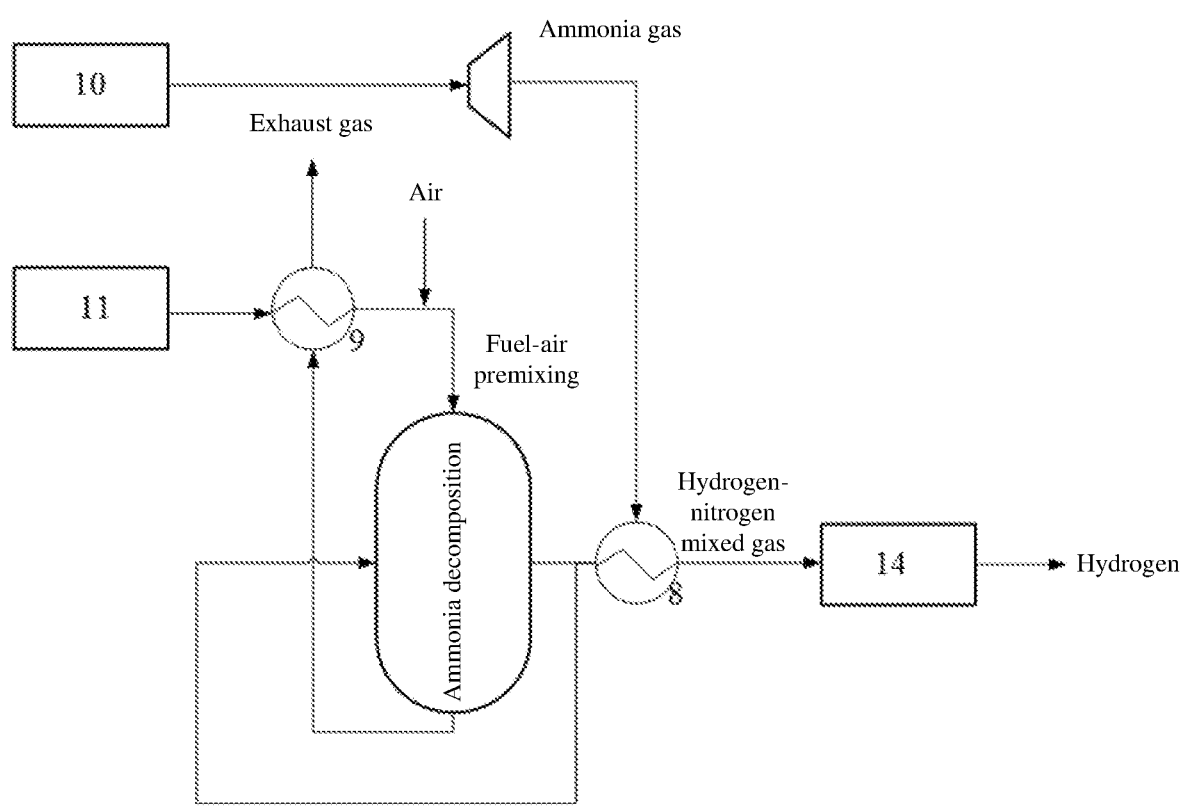
FIG. 7 is a structural schematic diagram of an ammonia decomposition system in embodiment 6 of the present invention.

The present embodiment further provides an ammonia decomposition hydrogen production system including the aforementioned apparatus, as shown in FIG. 7; and the ammonia decomposition hydrogen production system includes:

a first heat exchange device 8, respectively connected to the ammonia gas inlet of the heat exchange coil and the hydrogen-nitrogen mixed gas outlet of the second reaction zone, and capable of carrying out indirect heat exchange between the ammonia gas and the hydrogen-nitrogen mixed gas and feeding the ammonia gas to the first reaction zone after the indirect heat exchange; wherein specifically, in the present embodiment, the first heat exchange device is a first heat exchanger;

a second heat exchange device 9, respectively connected to the heat exchange zone and the heating zone, and capable of carrying out indirect heat exchange between an exhaust gas from the heat exchange zone and a fuel gas and feeding the fuel gas after the indirect heat exchange to the heating zone for combustion; wherein specifically, in the present embodiment, the second heat exchange device is a second heat exchanger;

a membrane separation device, connected to the first heat exchange device and capable of receiving the hydrogen-nitrogen mixed gas after heat exchange and carrying out separation to obtain the high-purity hydrogen;

an ammonia storage tank 10 connected to the first heat exchange device; and a fuel tank 11 connected to the second heat exchange device.

In addition, the present embodiment further provides an ammonia decomposition method, including the following steps: introducing an ammonia gas into a first reaction zone and a second reaction zone successively at a space velocity of 5000 mL/($g_{cat}$·h) to undergo decomposition to produce a nitrogen-hydrogen mixture; and feeding the nitrogen-hydrogen mixture into a membrane separation device to obtain high-purity hydrogen, wherein the first reaction zone has a reaction temperature of 850° C.; and the second reaction zone has a reaction temperature of 450° C.; and the obtained high-purity hydrogen exists in an amount of more than 94% by volume, and a hydrogen recovery rate is 92%.

Obviously, the embodiments described above are merely examples for clear description, and are not intended to limit the implementations. Other variations or modifications of the various forms may also be made by those skilled in the art based on the above description. There is no need and no way to exhaust all of the implementations herein. Obvious variations or modifications derived therefrom are still within the protection scope of the invention-creation.

What is claimed is:

1. An ammonia decomposition apparatus, comprising:
   a casing, comprising a heating zone and a heat exchange zone communicated successively;
   a reaction section, comprising a first reaction zone and a second reaction zone communicated successively, wherein the first reaction zone is disposed in the heating zone and filled with a nickel-based catalyst to form a nickel-based catalyst layer, and the second reaction zone is disposed in the heat exchange zone and filled with a ruthenium-based catalyst to form a ruthenium-based catalyst layer; and
   a heat exchange coil, spirally wound on outer walls of the second reaction zone and the first reaction zone successively, provided with an ammonia gas inlet which is disposed near a hydrogen-nitrogen mixed gas outlet of the second reaction zone and an ammonia gas outlet which is in communication with an ammonia gas inlet of the first reaction zone, and capable of feeding a preheated ammonia gas into the first reaction zone and the second reaction zone successively for carrying out reaction therein.

2. The ammonia decomposition apparatus according to claim 1, wherein a thickness ratio of the nickel-based catalyst layer to the ruthenium-based catalyst layer is (1-3):1.

3. The ammonia decomposition apparatus according to claim 1, wherein the reaction section has a height-to-diameter ratio of (5-10):1.

4. The ammonia decomposition apparatus according to claim 1, further comprising:
   a burner, disposed in the heating zone and located between an inner wall of the casing and the first reaction zone, and used for maintaining a reaction temperature in the first reaction zone; and
   a dividing plate, disposed in the casing to divide the casing to form the heating zone and the heat exchange zone, and provided with a plurality of exhaust gas through holes through which an exhaust gas in the burner enters the heat exchange zone to serve as a heat exchange medium therein.

5. The ammonia decomposition apparatus according to claim 1, wherein the ammonia decomposition apparatus comprises at least two of said reaction sections, which are disposed parallel to each other in the casing; and
a ratio of an inner diameter of each of the reaction sections to a particle diameter of the nickel-based catalyst or the ruthenium-based catalyst is (8-50):1.

6. The ammonia decomposition apparatus according to claim 4, wherein the reaction section is a fixed bed reactor; and
the burner is a porous medium burner or a catalytic burner.

7. An ammonia decomposition system, comprising:
the ammonia decomposition apparatus according to claim 1;
a first heat exchange device, respectively connected to the ammonia gas inlet of the heat exchange coil and the hydrogen-nitrogen mixed gas outlet of the second reaction zone, and capable of carrying out indirect heat exchange between the ammonia gas and the hydrogen-nitrogen mixed gas and feeding the ammonia gas to the first reaction zone after the indirect heat exchange; and
a second heat exchange device, respectively connected to the heat exchange zone and the heating zone, and capable of carrying out indirect heat exchange between an exhaust gas from the heat exchange zone and a fuel gas and feeding the fuel gas after the indirect heat exchange to the heating zone for combustion.

8. The ammonia decomposition system according to claim 7, further comprising:
a gas separation device, connected to the first heat exchange device and capable of receiving the hydrogen-nitrogen mixed gas after heat exchange and carrying out separation to obtain high-purity hydrogen, and comprising a pressure swing adsorption device and a membrane separation device in bidirectional communication, wherein the pressure swing adsorption device is connected to the first heat exchange device and capable of receiving the hydrogen-nitrogen mixed gas after heat exchange and carrying out separation to obtain the high-purity hydrogen; and
the membrane separation device is in bidirectional communication with the pressure swing adsorption device and capable of receiving an unseparated nitrogen-hydrogen mixture from the pressure swing adsorption device and passing the same therethrough and then recycling the same to the pressure swing adsorption device to undergo separation to obtain high-purity hydrogen; or
an ammonia removal device, connected to the first heat exchange device and capable of receiving the hydrogen-nitrogen mixed gas after heat exchange and removing residual ammonia in the hydrogen-nitrogen mixed gas, and further communicated with a hydrogen fuel cell and capable of feeding the hydrogen-nitrogen mixed gas after the removing of residual ammonia into the hydrogen fuel cell; and an exhaust gas outlet of the hydrogen fuel cell being connected to the second heat exchange device so that a hydrogen-containing exhaust gas discharged from the hydrogen fuel cell is mixed with the fuel gas and subjected to heat exchange and then fed into the heating zone for combustion; and
an ammonia storage tank connected to the first heat exchange device; and
a fuel tank connected to the second heat exchange device.

9. The ammonia decomposition system according to claim 7, wherein the first heat exchange device is a heat exchanger or an evaporator; and
the second heat exchange device is a heat exchanger or an evaporator.

10. An ammonia decomposition method using the ammonia decomposition apparatus of claim 1, comprising step of:
introducing ammonia gas into the first reaction zone and the second reaction zone successively at a space velocity of 500-10000 mL/($g_{cat}$·h) to undergo decomposition to produce a nitrogen-hydrogen mixture, wherein the first reaction zone has a reaction temperature of 650-850° C.; and the second reaction zone has a reaction temperature of 450-600° C.

11. The ammonia decomposition apparatus according to claim 2, wherein the reaction section has a height-to-diameter ratio of (5-10):1.

12. The ammonia decomposition apparatus according to claim 2, further comprising:
a burner, disposed in the heating zone and located between an inner wall of the casing and the first reaction zone, and used for maintaining a reaction temperature in the first reaction zone; and
a dividing plate, disposed in the casing to divide the casing to form the heating zone and the heat exchange zone, and provided with a plurality of exhaust gas through holes through which an exhaust gas in the burner enters the heat exchange zone to serve as a heat exchange medium therein.

13. The ammonia decomposition apparatus according to claim 2, wherein the ammonia decomposition apparatus comprises at least two of said reaction sections, which are disposed parallel to each other in the casing; and
a ratio of an inner diameter of each of the reaction sections to a particle diameter of the nickel-based catalyst or the ruthenium-based catalyst is (8-50):1.

14. The ammonia decomposition apparatus according to claim 12, wherein the reaction section is a fixed bed reactor; and
the burner is a porous medium burner or a catalytic burner.

15. The ammonia decomposition system according to claim 8, wherein the first heat exchange device is a heat exchanger or an evaporator; and
the second heat exchange device is a heat exchanger or an evaporator.

* * * * *